United States Patent [19]
Reinert et al.

[11] Patent Number: 4,955,251
[45] Date of Patent: Sep. 11, 1990

[54] ADJUSTING DEVICE FOR THE POINTER ELEMENT OF A DRIVE RANGE INDICATING DISPLAY

[75] Inventors: Karl A. Reinert; Gary W. Alcorn, both of Saginaw, Mich.

[73] Assignee: General Motors Corporation, Detroit, Mich.

[21] Appl. No.: 446,344

[22] Filed: Dec. 5, 1989

[51] Int. Cl.⁵ .......................... F16C 1/10; G01D 5/04
[52] U.S. Cl. ..................... 74/501.5 R; 74/500.5; 74/473 R; 74/473 SW; 116/28.1; 116/DIG. 20
[58] Field of Search .......... 74/473 R, 473 SW, 500.5, 74/501.5 R, 501.6, 502.4, 502.6; 116/28.1, DIG. 20

[56] References Cited

U.S. PATENT DOCUMENTS

| | | | |
|---|---|---|---|
| 3,804,055 | 4/1974 | Nishikawa et al. | 116/28.1 |
| 3,818,779 | 6/1974 | Skelley | 74/473 SW |
| 3,990,387 | 11/1976 | Martin | 116/28.1 |
| 4,096,765 | 6/1978 | Cochran | 74/473 R |
| 4,213,415 | 7/1980 | Coha et al. | 116/28.1 |
| 4,261,282 | 4/1981 | Satou et al. | 116/DIG. 20 |
| 4,552,032 | 11/1985 | Kanai | 74/500.5 X |
| 4,782,782 | 11/1988 | Nill | 116/DIG. 20 |
| 4,805,476 | 2/1989 | Beauch et al. | 74/473 SW |
| 4,821,593 | 4/1989 | Kobylarz | 116/28.1 X |
| 4,838,197 | 6/1989 | Watson | 116/28.1 |

FOREIGN PATENT DOCUMENTS 1002817  1/1977  Canada ................................ 116/28.1

*Primary Examiner*—Vinh T. Luong
*Attorney, Agent, or Firm*—Donald F. Scherer

[57] ABSTRACT

An adjusting device (10) for coordinating the position of a pointer element (25) in a drive range indicator assembly (23) with the position of a drive range selecting lever (15) by varying the effective length of the control cable (18) operatively connected therebetween. The control cable (18) has a sheath (20) and core (16). One end of the core (16) is attached to the pointer element (25), and the other end is attached to the drive range selecting lever (15). The device (10) has a base, or frame structure (29), and a block (40) is mounted for reciprocation on the frame structure (29). One end of the sheath (20) is attached to the housing (22) of the indicator assembly (23), and the other end of the sheath (20) is attached to the block (40). An operating lever (55) is pivotally mounted to frame structure (30) and operatively connected to the block (40) such that pivotal rotation of the operating lever (55) in opposite directions effects reciprocation of the block (40) to adjust the effective length of the control cable (18).

4 Claims, 2 Drawing Sheets

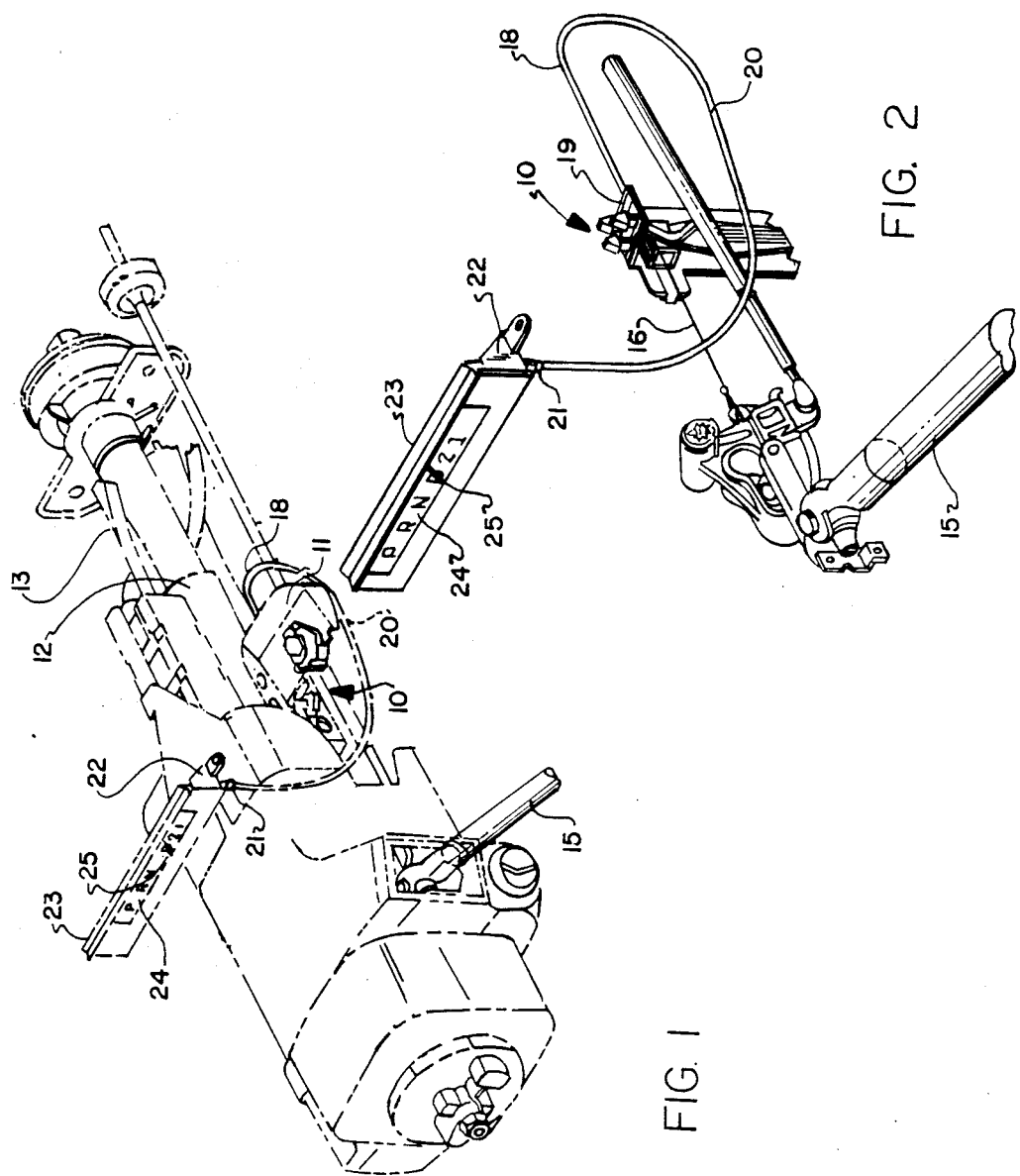

ADJUSTING DEVICE FOR THE POINTER ELEMENT OF A DRIVE RANGE INDICATING DISPLAY

TECHNICAL FIELD

The present invention relates generally to a device used to adjust the position of the pointer element in a transmission drive range indicator. More particularly, the present invention relates to a device which interacts with the control cable that is operatively attached between the pointer element of a transmission drive range indicator and the drive range selecting lever in order to adjust and coordinate the position of the pointer element with respect to the drive range selecting lever. Specifically, the present invention relates to a device used to adjust the effective length of the control cable which operatively connects the pointer element of a transmission drive range indicator with the drive range selecting lever in order to adjust, and coordinate, the position of the pointer element with respect to the actual drive range in which the transmission is operating.

BACKGROUND OF THE INVENTION

Vehicles which employ automatic transmissions are normally provided with a drive range indicator that visually identifies the specific drive range in which the transmission of the vehicle is currently operating. Such indicators are often located adjacent to the drive range selecting lever itself, and when the drive range selecting lever is located on the console between the two front seats such a location requires that the operator of the vehicle shift not only his gaze, but perhaps even his head in order to read the drive range indicator. Those installations in which the drive range selecting lever is located on the steering column and presents a pointer element which is directly secured to the drive range selecting lever obviate the aforesaid problem, but such installations do utilize a rather substantial housing assembly within which to encase the indicator mechanism. As is well known, the indicator scale includes symbols to identify the various operating ranges of the transmission which may be selected by the operator of the vehicle. Such symbols typically include the letter P to indicate "park", R to indicate "reverse", D to indicate "drive" and one or more L's (or even numerical designations 1, 2, etc. to indicate the low range, or ranges, available). The size of the housing required to contain the various components of the drive range indicator is generally considered to be sufficient to block the desired view of the instrument panel, and as such the trend is to include the drive range indicator display as one of the "gauges" in the instrument panel itself.

In any typical drive range indicator the pointer element moves in conjunction with the drive range selecting lever to identify the drive range within which the transmission is operating. Thus, as the drive range selecting lever is operated to select the desired shift range, the pointer element moves to designate the appropriate symbol. A typical prior art indicator assembly having a pointer element is depicted in the drawings of U.S. Pat. No. 3,990,387, issued to Martin, Nov. 9, 1976, and assigned to the assignee of the present invention.

As depicted in U.S. Pat. No. 4,213,415, issued to Coha et al., July 22, 1980, and assigned to the assignee of the present invention, drive range indicator assemblies employ a control cable which operates between the drive range selecting lever and the pointer element. Control cables employed in representative arrangements typically have a sheath portion and a core portion that is slidably received within the sheath portion. Translation of the core within the sheath effects movement of the pointer element against the biasing action of a spring means. As such, the drive range selecting lever is normally connected to the pointer element by virtue of the core in a control cable.

In a typical installation where the drive range selecting lever is connected to the pointer element by the core of a control cable, it is known that by varying the effective length of the control cable the position of the pointer element can be adjusted with respect to the indicator scale without movement of the drive range selecting lever.

It must be appreciated that it is extremely difficult to have each component of the drive range indicator assembly, the control cable and the drive range selecting lever always of the exact same dimension so that when all parts are assembled the pointer element will always align exactly with the appropriate symbol on the indicator scale. Inasmuch as a misaligned pointer element would result in an erroneous, or confusing, indication of the shift range which has been selected for the transmission, a need exists for a device by which to adjust the coordinated response of the pointer element to the movement of the drive range selecting lever in order accurately to designate the shift range selected for the transmission.

Heretofore, one end of the control cable sheath has been secured to the housing of the indicator assembly in proximity to that end of the sheath from which the core exits for attachment to the pointer element, and the other end of the sheath has been connected to an adjusting member that is secured to a mounting member. The fastening means, normally a screw, by which the adjusting member is secured to the mounting member may be threadably received within the mounting member frictionally to lock the adjusting member in the selected position. As such the fastening means may be loosened to permit the adjusting member to be selectively moved along the mounting member, thereby accomplishing an adjustment to the effective length of the control cable. When the desired effective length of the control cable has been achieved, the fastening means must be re-tightened. This arrangement possesses some inherent difficulties, particularly because it is often difficult to maintain the selected position of the adjusting member relative to the mounting member while the fastening means is being re-tightened, and also because the very process of re-tightening the fastening means will itself sometimes cause the adjusting member to move with respect to the mounting member.

SUMMARY OF THE INVENTION

It is, therefore, a primary object of the present invention to provide an improved device for adjusting the position of the pointer element in a vehicle drive range indicator relative to the symbols on the indicator scale of the drive range indicator without movement of the drive range selecting lever.

It is another object of the present invention to provide a device, as above, which can be effectively employed selectively to adjust the effective length of the control cable connecting the pointer element in a drive range indicator to the drive range selecting lever.

It is a further object of the present invention to provide a device, as above, which may be manipulated accurately to adjust the position of the pointer element without the need for tools or without the need for particularly well developed manual dexterity on the part of the user.

It is still another object of the present invention to provide a device, as above, which securely maintains the effective length of the control cable selected thereby.

These and other objects of the invention, as well as the advantages thereof over existing and prior art forms, which will be apparent in view of the following detailed specification, are accomplished by means hereinafter described and claimed.

In general, a device embodying the concepts of the present invention is adapted to adjust the effective length of a control cable having a sheath portion and a core portion. The control cable is employed to connect the drive range indicator assembly of a vehicle with the drive range selecting lever in order to coordinate the designation presented by the indicator with respect to the position of the drive range selecting lever. The adjusting device embodying the concepts of the present invention has a base, or frame structure, which permits it to be positioned in the desired location on the vehicle. A block is slidably mounted on the frame structure for reciprocating movement, and one end of the sheath portion of the control cable is secured to the block.

An operating lever is pivotally mounted on the base, and the operating lever is connected to the block so that rotation of the operating lever effects selective reciprocation of the block. Locking means are operatively effective between the operating lever and the base to secure the selected location of the block, and thereby the effective length of the control cable.

One exemplary embodiment of an adjusting device is deemed sufficient to effect a full disclosure of the subject invention, is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 1 a generally frontal, schematic elevational view of a portion of a vehicular steering column from which a drive range selecting lever extends, to which an adjusting device embodying the concepts of the present invention is mounted and from which a control cable extends to a schematically represented drive range indicator assembly;

FIG. 2 is an enlarged perspective of the drive range selecting lever, depicting its connection to the core of a control cable, an adjusting device embodying the concepts of the present invention, the sheath portion of the control cable being secured to the adjusting device and extending to a drive range indicator assembly;

DESCRIPTION OF AN EXEMPLARY EMBODIMENT

Figure 3:
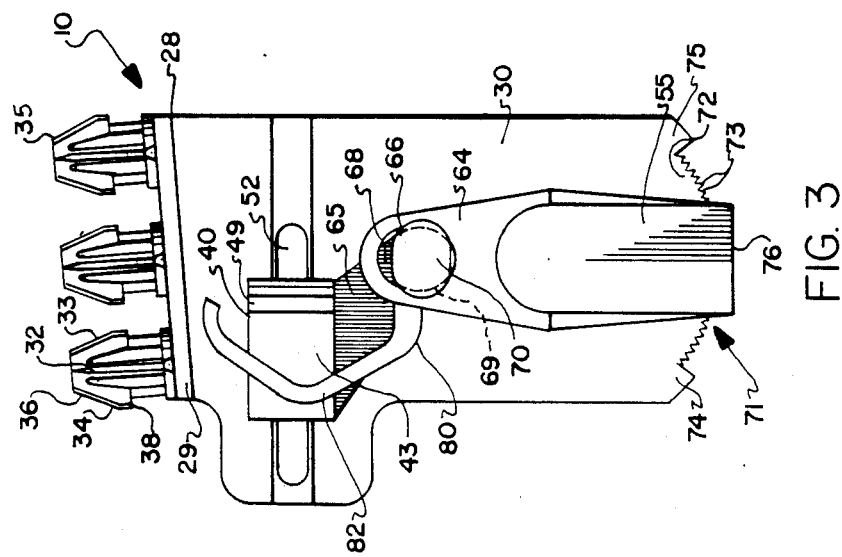
FIG. 3 is a side, elevational view of the adjusting device schematically in FIGS. 1 and 2; and, FIG. 4 is a frontal elevation of the adjusting device depicted in FIG. 3.

With reference to FIG. 1, the adjusting device 10 may be secured to a flange 11 which extends radially outwardly from the jacket 12 of a steering column assembly 13. A drive range selecting lever 15 also extends radially outwardly from the steering column assembly 13, and the mechanism of the drive range selecting lever 15 is attached, by means well known to the art, to the core 16 of a control cable 18. One end 19 of the control cable sheath 20 is secured to the adjusting device 10 in a manner hereinafter more fully explained, and the other end 21 of the sheath 20 is secured to the housing 22 of the indicator assembly 23 in a manner well known to the art.

The indicator assembly 23 may be located where ever desired, but customarily the indicator assembly 23 utilizes a display 24 that is presented from the instrument panel (not shown). As shown, the display 24 may present a plurality of symbols P, R, N, D, 2, and 1 which serve to identify the several operating ranges of the transmission (also not shown) to which the drive range selecting lever 15 is operatively connected. The display 24 also includes a pointer element 25, and the pointer element is attached to the core 16 of the control cable 18 in well known manner. The pointer element is also operatively connected to a spring means (also not shown) which biases the pointer element 25 in a direction opposite to the pull of the control cable core 16. The pull by the core 16 which moves the pointer element 25 is effected by movement of the drive range selecting lever 15 in one direction, as is well known to the art. Similarly, movement of the drive range selecting lever 15 in the opposite direction allows the spring means to translate the core 16, thereby moving the pointer element 25 in the opposite direction, as is also well known to the art. Movement of the drive range selecting lever 15 thus translates the core 16, and the pointer element 25 attached thereto, so that the pointer element 25 will be located in proximity to that symbol which represents the drive range in which the transmission is then operating. The adjusting device 10 offers the advantage of permitting minute adjustments to the position of the pointer element 25 relative the drive range symbols, so that the display 24 will unequivocally register the exact drive range selected.

As is known, varying the slack in the control cable sheath 20 between indicator assembly 23 and the adjusting device serves to change the effective length of the overall control cable 18. This change in the effective length of the control cable 18 causes the core 16 of the control cable 18 to move in one direction when the effective length of the control cable 18 is lengthened and to move in the opposite direction when the effective length of the control cable 18 is shortened. It has, therefore, been known in the art to provide devices by which to vary the slack in the cable sheath 20, and thereby the effective length of the control cable 18. The present invention provides a new and useful device for accomplishing such an adjustment.

Figure 4:
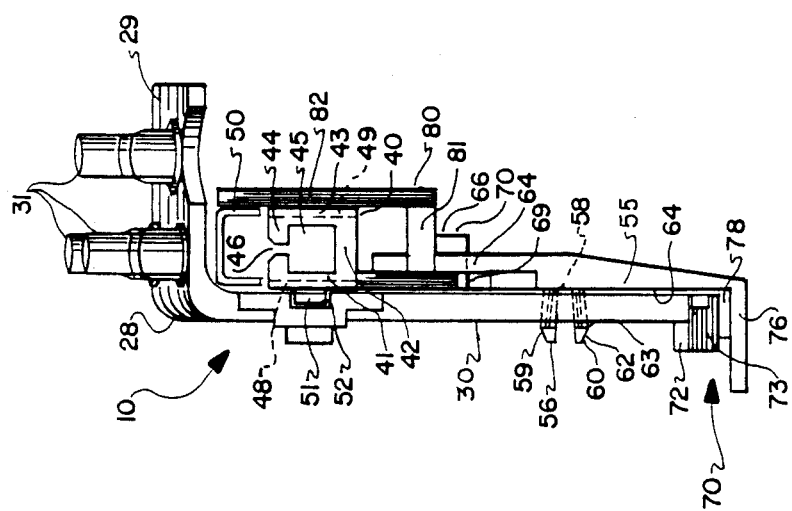

With more particular reference to FIGS. 3 and 4, the adjusting device 10 has a base, or frame structure, 28 which includes a mounting arm 29 and a supporting arm 30 which extends perpendicularly outwardly from the mounting arm 29, as is perhaps best seen from FIG. 4. With reference to FIG. 3, the disposition of the mounting arm 29 relative to the face of the supporting arm 30 may be at some selected angle in order to achieve the desired orientation of the mechanism mounted on the supporting arm 30, as will be hereinafter more fully explained.

A plurality of attaching pins 31 extend upwardly from the mounting arm 29. The attaching pins 31 are depicted as winged push pins. That is, each attaching pin 31 has a central rib 32 with a pair of resilient wing members 33 and 34, one on either side of the central rib 32. The wing members may, as depicted, extend outwardly from the mounting arm 29 and be attached, at their axially outermost extent 35, to the central rib 32. Each wing member 33 and 34 has an outwardly extending projection, the axially outermost surface of which presents a tapered cam 36 which terminates, at its axially innermost extent, in an axially inwardly facing, offset shoulder 38. As such, when the attaching pins 31 are inserted through a receiving aperture (not shown) in the mounting flange 11, the cam surfaces 36 will engage the circumferential boundary walls of the apertures to flex the wing members 33 and 34 radially inwardly so that they can pass through the apertures. Once the wing members 33 and 34 have penetrated the apertures to the point where the mounting arm 29 engages the flange 11, the wing members 33 and 34 will snap radially outwardly so that the flange 11 will be engaged between the mounting arm 29 and the shoulders 38 to secure the adjusting device 10 to the flange 11.

A block 40 is mounted on the supporting arm 30 for reciprocating movement. The block 40 is preferably of rectangular cross section with four walls 41, 42, 43 and 44 which surround a central opening 45 which may extend longitudinally through the block 40. Wall 44 is provided with a longitudinal discontinuity 46 such that the opposed walls 41 and 43 can flex, from wall 42, toward and away from each other. The opposed walls 41 and 43 are also provided with transverse slots 48 and 49, respectively, so that when the sheath 20 of a control cable 18 is received within the central opening 45, the walls 41 and 43 can be flexed toward each other frictionally to grip the sheath 20 of the control cable 18 and a retaining clip 50 can be received within the oppositely disposed slots 48 and 49 to secure the sheath 20 within the central opening 45.

A tracking rib 51 extends outwardly from the wall 41 to be slidably received within a guideway 52 that is recessed into the supporting arm 30. The guideway 52 extends only part way along the lateral dimension of the supporting arm 30 to define the range within which the block 40 can be reciprocated.

An operating lever 55 is pivotally mounted on the supporting arm 30 by an axle pin 56 which is received in bearing aperture 58 that penetrates the supporting arm 30. For convenience of manufacture and assembly, the axle pin 56 may be a split wing pin. That is, a pair of opposed arms 59 and 60 may extend perpendicularly outwardly from the central portion of the operating lever 55. The axially outer end of each arm 59 and 60 is provided with a beveled cam surface 62 on the axially outermost portion thereof and which presents an offset shoulder 63 on the axially innermost side thereof. The arms 59 and 60 may be flexed toward each other but will, when released, spring back to their normal disposition. As such, by providing a cam surface 62 on the axially outermost portion of each arm 59 and 60 of the axle pin 56 will guide itself into the bearing aperture 58 during assembly, and when the arms 59 and 60 penetrate the supporting arm 30, the arms 59 and 60 will snap apart to grasp the supporting arm 30 between the offset shoulder 63 and the rear surface 64 of the operating lever 55. Such an arrangement not only provides a secure attachment between the operating lever 55 and the supporting arm 30 but also permits the operating lever 55 to be selectively rotated. Even so, such an arrangement nevertheless allows the operating lever 55 to be removed from the supporting arm 30 by manually pinching the outermost ends of the arms 59 and 60 so that the offset shoulders 63 on the opposed arms 59 and 60 can be inserted into the bearing aperture.

The operating lever 55 is pivotally connected to the block 40 by an extension arm portion 64 which is attached to, or integrally formed with, and extends outwardly from the operating lever 55 to overlie a connecting arm 65 that extends outwardly from the block 40. The connecting arm may, as depicted in FIG. 4, be coplanar with the wall 41 of block 40 and therefore substantially perpendicular to wall 42. A T-head pivot pin 66 extends substantially perpendicularly outwardly from the connecting arm 65. As generally apparent from its name, the pivot pin 66 has a generally cylindrical shaft portion 69 which extends outwardly from the connecting arm 65 and terminates in a head portion 70 that is generally elliptical, as viewed in FIG. 3, and yet has the appearance of the letter "T" when viewed in the side elevation. The receiving aperture may, therefore, also be of generally elliptical configuration, as depicted in FIG. 3. As such, the T-head pivot pin 69 may be conveniently inserted through the receiving aperture 68 in the extension arm 64 of the operating lever 55 when the major axis of the head portion 70 is aligned with the major axis of the receiving aperture 68, and yet when those axes are not aligned, as when the operating lever 55 and the block 40 are mounted on the supporting arm 30, relative rotation between the extension arm 64 and the connecting arm 65 is permitted but disengagement of the pivot pin 66 from the receiving aperture 68 is precluded. In view of the afore-described structural arrangement, rotation of the operating lever 55 about the axis of the axle pin 56 effects selected reciprocation of the block 40.

A locking means 71 is provided to be operatively effective between the operating lever 55 and the supporting arm 30. As shown, that end portion of the supporting arm 30 disposed oppositely of the mounting arm 29 terminates in a quadrant 72, the arcuate surface of which presents a plurality of uniformly spaced teeth 73. Boundary stops 74 and 75 are located, one at either end of the quadrant 72. The end of the operating lever 55 adjacent the quadrant 72 terminates in a latch plate 76 which extends perpendicularly from the operating lever 55 to overlie the quadrant 72. One or more uniformly spaced teeth 78 are presented from the latch plate 76 to engage between an appropriate number of corresponding teeth 73 on the quadrant 72. The latch plate 76 is permitted to flex in conjunction with an adjacent portion of the operating lever 55 so that the teeth 78 on the latch plate can be selectively disengaged from the teeth 73 on the quadrant 72. Thus, one can flex the latch plate 76 to release the teeth 78 thereon from the teeth 73 on the quadrant 72, and with the teeth 73 and 78 so disengaged, the operating lever 55 can be rotated to effect reciprocation of the block 40.

One way in which to provide the desired resilience for the operating lever 55, and particularly the latch plate 76, in order effectively to release and engage the latching means 71 is to fabricate the operating lever 55 from a material which possesses the desired physical characteristics. As such, the operating lever 55 can well be made of nylon, a polyester, a polyolefin or the like.

In fact, the entire adjusting device 10 can be fabricated from such materials.

A restraining arm 80 is preferably employed to prevent the block 40 from inadvertently disengaging from the supporting arm 30. A spacer bar 81 extends substantially perpendicularly upwardly from the operating lever 55 in proximity to the receiving aperture 68 to support a preferably bowed, resilient arm 82 which extends over the block 40 in sliding engagement with the wall 43. Engagement of the bowed arm 82 with the block assures that the tracking rib 51 remains within the guideway 52, even when the block 40 might be subjected to a sufficient loading that would otherwise tend to displace the block 40 outwardly away from the supporting arm 30. In the embodiment represented in the drawings, the restraining arm 80 is depicted as extending from operating lever 55. This is a preferable embodiment because restraining arm 80 will travel with the rotation of the operating lever 55, and therefore always be in engagement with block 40, regardless of the position thereof along its linear path.

To summarize, when the operating lever 55 is rotated about the axle pin 56, the block 40 reciprocates, and because the sheath 20 is secured to the block 40, reciprocation of the block 40 causes the sheath 20 to slide over the core 16 received therein, and that movement alters the effective length of the control cable 18 such that the core 16 effects movement of the pointer element 25. Specifically, the pointer element 25 moves in an opposite direction from the movement of the block 40. But after the block 40 has been moved to a sufficient degree to alter the effective length of the control cable 18 such that pointer element 25 is properly aligned over the symbol on the display 34 which corresponds to the drive range in which the transmission has been set, the latch plate 76 is released, causing the teeth 73 and 78 to re-engage. Because the teeth 73 and 78 cannot disengage without direct pressure to latch plate 76, the operating lever 55, and therefore the block 40, are effectively locked in position and cannot move until the teeth 73 and 78 have been disengaged.

Although the afore-described locking means 71 is particularly effective without being particularly complicated, it must be appreciated that locking of the operating lever 55 may be accomplished by other means without departing from the spirit of the present invention.

As should now be apparent, the present invention not only teaches that a relatively uncomplicated device can be employed for adjusting the position the pointer element in a vehicle drive range indicator with relative ease but also that the other objects of the invention can likewise be accomplished.

The embodiments of the invention in which an exclusive property or privilege is claimed are defined as follows:

1. In combination, a device for adjusting the effective length of a control cable having a sheath and core, the control cable being employed to interconnect the pointer element of a vehicle drive range indicator assembly with the drive range selecting lever in order to coordinate the designation presented by the indicator assembly with respect to the position of the drive range selecting lever, said device comprising: a frame structure; a block mounted on said frame structure for reciprocating movement; means to secure the control cable sheath to said block; an operating lever being pivotally mounted on said frame structure; said operating lever being operatively connected to said block such that rotation of said operating lever effects selected reciprocation of said block; and, locking means operatively effective between said operating lever and said frame structure to secure the selected location of said block.

2. A device for adjusting the effective length of a control cable having a sheath and core, the control cable being employed to interconnect the pointer element of a vehicle drive range indicator assembly with the drive range selecting lever in order to coordinate the designation presented by the indicator assembly with respect to the position of the drive range selecting lever, said device comprising: a frame structure; a block mounted on said frame structure for reciprocating movement; means to secure the control cable sheath to said block; an operating lever having first and second ends with an axle pin located medially of said first and second ends; a bearing aperture provided in said frame structure pivotally to receive said axle pin; said second end of said operating lever being connected to said block such that rotation of said operating lever effects selected reciprocation of said block; a quadrant presented from said frame structure in proximity to said first end of said operating lever; a latch plate presented from said first end of said operating lever, said latch plate overlying said quadrant; a plurality of teeth presented from said quadrant; teeth means presented from said latch plate; the teeth means on said latch plate being normally engaged with said teeth on said quadrant to secure said operating lever in position; and, said latch plate and a portion of said operating lever being subject to selective manipulation so as to disengage said teeth means on said latch plate from said teeth on said quadrant to permit selective rotation of said operating lever.

3. A device for adjusting the effective length of a control cable having a sheath and core, the control cable being employed to interconnect the pointer element of a vehicle drive range indicator assembly with the drive range selecting lever in order to coordinate the display presented by the indicator assembly with respect to the position of the drive range selecting lever, said device comprising: a frame structure having a mounting arm and a supporting arm; a guideway recessed into said supporting arm; a block mounted on said supporting arm for reciprocating movement; said block having a tracking rib thereon slidably received within said guideway; means to secure the sheath of the control cable to said block; an operating lever having first and second ends and pivotally mounted to said supporting plate; a pivot pin movable with said block; said pivot pin having a shaft portion terminating in a T-head having an elliptical configuration; an elliptically shaped receiving aperture presented from the second end of said operating lever; said T-head capable of passing through said receiving aperture when said operating lever and said block are not mounted on said supporting arm but being precluded from passing therethrough when said operating lever and said block are mounted on said supporting arm; locking means operatively effective between said operating lever and said supporting arm to secure said block in a selected position along its range of translational movement.

4. A device, as set forth in claim 3, wherein: a restraining arm extends from said operating lever to overlie said block and prevent said block from inadvertently disengaging from said support arm.

* * * * *